(12) United States Patent
Froese

(10) Patent No.: US 11,268,321 B2
(45) Date of Patent: Mar. 8, 2022

(54) LED SLAT DEVICE

(71) Applicant: Brad Froese, Lubbock, TX (US)

(72) Inventor: Brad Froese, Lubbock, TX (US)

( * ) Notice: Subject to any disclaimer, the term of this patent is extended or adjusted under 35 U.S.C. 154(b) by 277 days.

(21) Appl. No.: 16/403,507

(22) Filed: May 4, 2019

(65) Prior Publication Data

US 2019/0352962 A1 Nov. 21, 2019

Related U.S. Application Data

(60) Provisional application No. 62/667,014, filed on May 4, 2018.

(51) Int. Cl.

| | | |
|---|---|---|
| *E06B 9/386* | (2006.01) | |
| *E06B 9/36* | (2006.01) | |
| *E06B 7/28* | (2006.01) | |
| *F21V 23/00* | (2015.01) | |
| *F21V 23/04* | (2006.01) | |
| *F21V 33/00* | (2006.01) | |
| *F21V 8/00* | (2006.01) | |
| *E06B 7/084* | (2006.01) | |
| *F21Y 115/10* | (2016.01) | |
| *F21Y 113/13* | (2016.01) | |

(52) U.S. Cl.
CPC ............. *E06B 9/386* (2013.01); *E06B 7/28* (2013.01); *E06B 9/368* (2013.01); *F21V 23/004* (2013.01); *F21V 23/0435* (2013.01); *F21V 23/0485* (2013.01); *F21V 33/0016* (2013.01); *E06B 7/084* (2013.01); *F21Y 2113/13* (2016.08); *F21Y 2115/10* (2016.08); *G02B 6/009* (2013.01); *G02B 6/0055* (2013.01)

(58) Field of Classification Search
CPC .......... E06B 9/24–50; E06B 2009/2405–2494; E06B 2009/2622–2627; E06B 2009/2643–2646; E06B 2009/285; E06B 2009/3222–3227; E06B 2009/3265; E06B 2009/402–407; F21V 23/004; F21V 23/0435; F21V 23/0485
See application file for complete search history.

(56) References Cited

U.S. PATENT DOCUMENTS

| | | | | |
|---|---|---|---|---|
| 2011/0126992 | A1* | 6/2011 | Yordanova | ............... E06B 9/386 160/127 |
| 2012/0313512 | A1* | 12/2012 | Yamada | .................. E06B 9/303 313/504 |
| 2016/0002974 | A1* | 1/2016 | Boyle | ..................... E06B 9/386 160/173 R |
| 2017/0095103 | A1* | 4/2017 | Pham | ...................... E06B 9/326 |

FOREIGN PATENT DOCUMENTS

| | | | | |
|---|---|---|---|---|
| CN | 106761307 | A | * | 5/2017 |
| JP | 2018055011 | A | * | 4/2018 |
| KR | 20160039046 | A | * | 4/2016 |
| KR | 20160112302 | A | * | 9/2016 |
| KR | 20170120975 | A | * | 11/2017 |
| WO | WO-2010066245 | A1 | * | 6/2010 ............ F21V 33/004 |

* cited by examiner

*Primary Examiner* — Mariceli Santiago
(74) *Attorney, Agent, or Firm* — Wilson Daniel Swayze, Jr.

(57) ABSTRACT

A window blind assembly to provide illumination to the interior of a room and to prevent sunlight from entering the room includes a multitude of the light emitting diode (LED) slats mounted in the window opening of a window frame and being rotatably connected to the window frame: a controller being embedded in the window blind assembly and configured to control the function of each row of the LED slats.

7 Claims, 4 Drawing Sheets

LED SLAT DEVICE

FIELD OF THE INVENTION

The invention relates to window blind assemblies or more specifically to one that has slats that can be illuminated.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
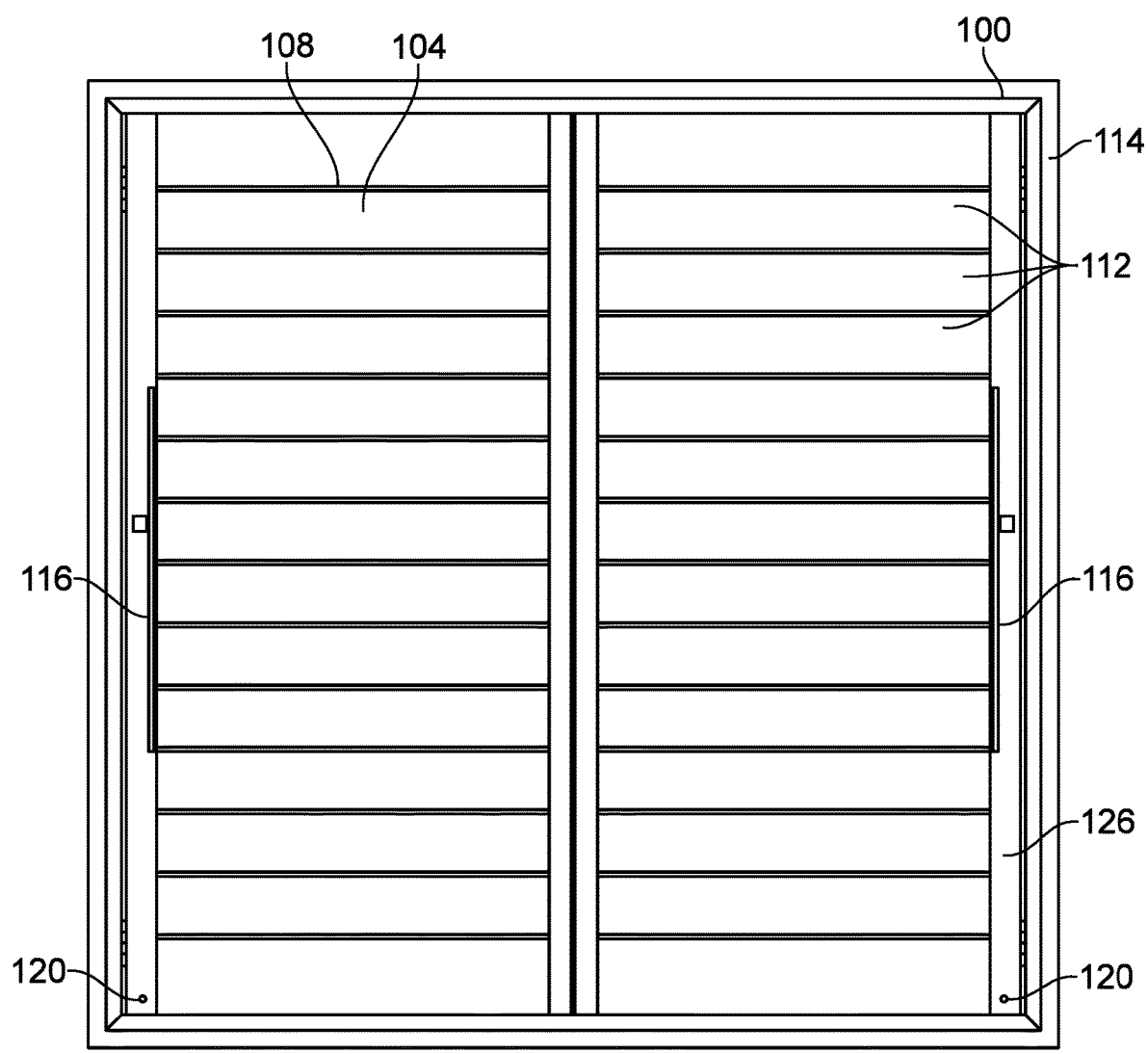
FIG. 1 illustrates the LED slats of the present invention.

The illuminated window blind assembly 100 as illustrated in FIG. 1 has been designed to provide illumination to the interior of a room and prevent sunlight from entering the room. The window blind assembly 100 of the present invention would be mounted in the window opening of a window frame 114. The multitude of the LED slats 112 may be rotatably connected to the shutter stile 126. The window blind assembly 100 of the present invention may have at least two embodiments, one has the slats oriented horizontally and the other has the slats oriented vertically. FIG. 1 shows the slats being oriented horizontally The slats have a top surface 106 and a bottom surface 104 which may be connected to the top surface 106 by an opposing side surfaces 108. The top surface 106 would be the surface that would be exposed to the outside sunshine. The bottom surface 104 would be the surface that would be exposed to the interior living area. The slats could be formed from any of many different materials such as wood, metal or plastic. The preferred embodiment would use extruded plastic slats.

FIG. 1 additionally illustrates a controller 116 which may be embedded in order to control the functions of each row of the LED panels. Embedded with the controller 116 may be a switch to control the on off functions of the LED panels and may be a capacitive switch in order to sense a finger of the user in close proximity to the capacitive switch. In addition, an electric receptacle 120 may be placed on the stile 126 to receive power for the LED slat device 100.

Figure 2:
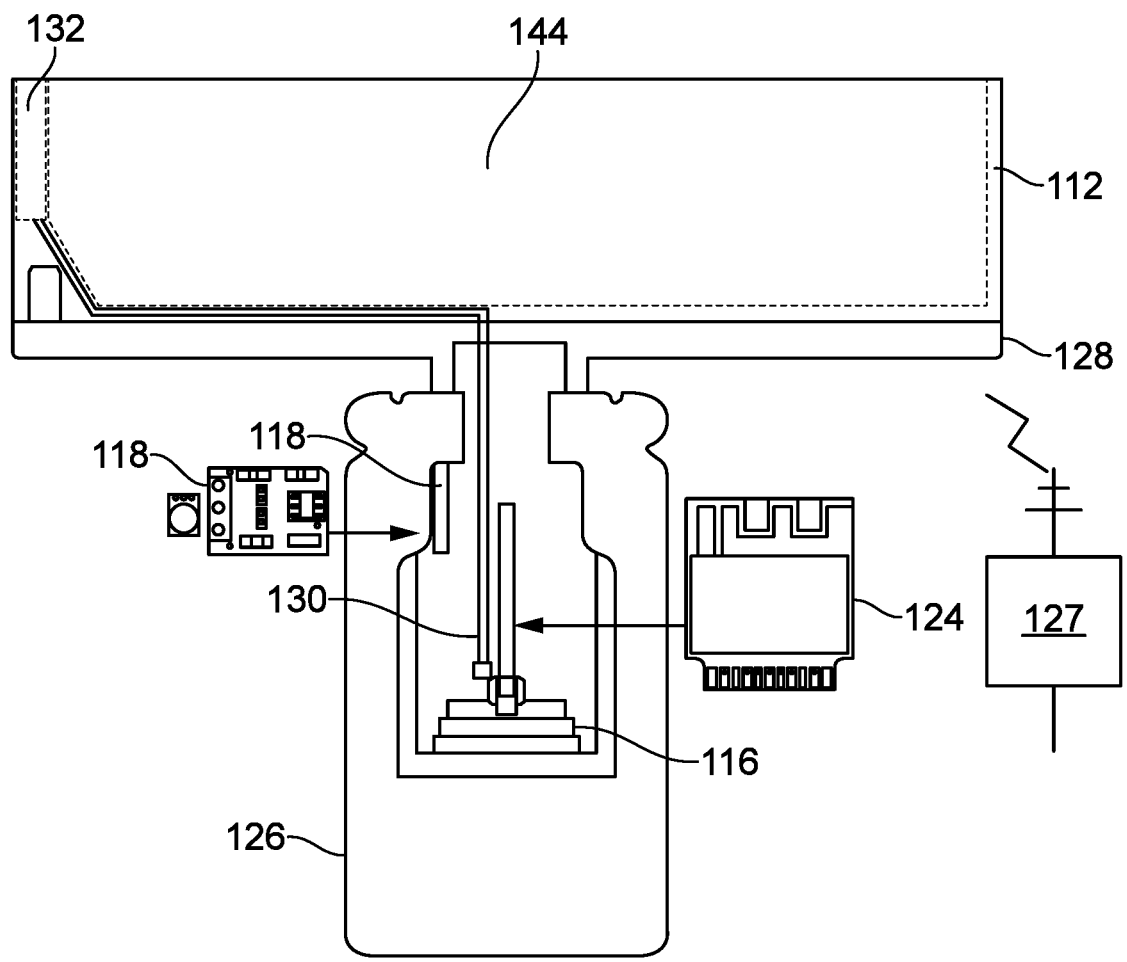
FIG. 2 illustrates a circuit diagram of the present invention.

FIG. 2 illustrates a top view of a stile 126 which may be the upright or vertical perimeter pieces of a sash, panel or screen, the slat 112 and the end cap enclosure 128. FIG. 2 illustrates the controller 116 (shown as a printed circuit board (PCB)), the capacitive touch switch 118 and a wireless receiver 124 which may be a Wi-Fi or Bluetooth transceiver to send and receive wireless signals from a remote source 127. The controller 116 may be held in position by adhesive.

LED wiring 130 may extend from the stile 126 through the end cap enclosure 128 to the slat and may terminate at the LED light strip 132 to distribute light to the light guide plate 144.

Figure 3:
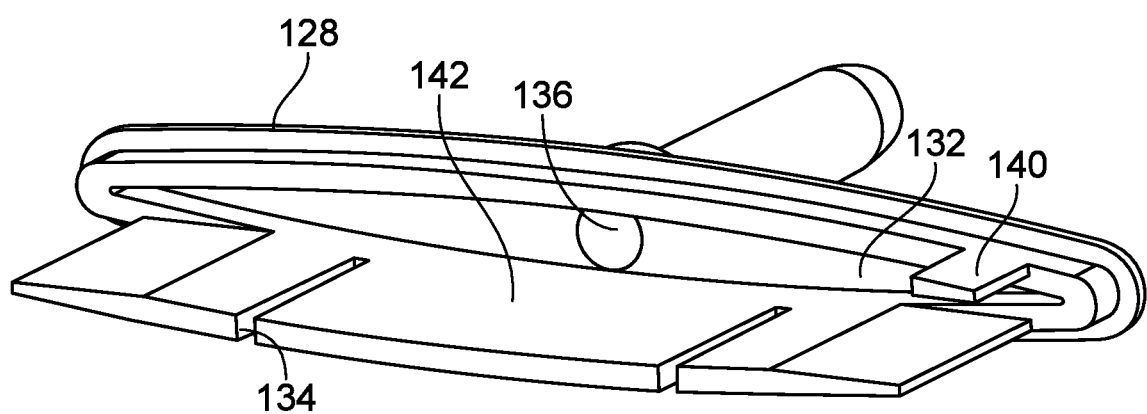
FIG. 3 illustrates an end cap enclosure of the present invention.

FIG. 3 illustrates a perspective view of the end cap enclosure 128, and the end cap enclosure 128 includes a cylinder 136 which may be connected to a horizontal wall 132 having a shoulder 140 which extends around the periphery of the horizontal wall 132. The horizontal wall 132 may be connected to a vertical wall 142 which may extend from the horizontal wall 132. The vertical wall 142 may include slits 134.

Figure 4:
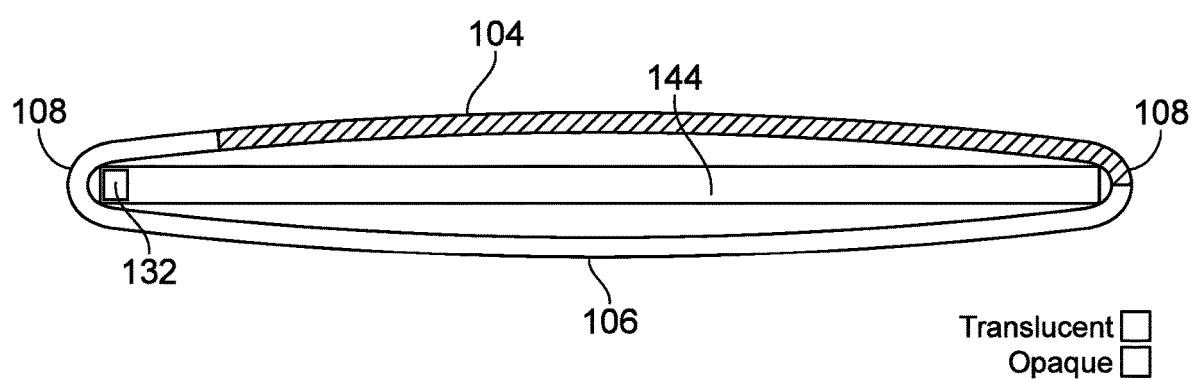
FIG. 4 illustrates a slat of the present invention.

FIG. 4 illustrates a cross sectional view of the LED slats 112. The window shutter includes slats 112 having two surfaces: one side—the top surface 106—the side that faces outside when the slats 112 are closed is completely opaque and functions to provide shade and privacy to interior spaces. The other side—the bottom surface 104—the side that faces inside when the slats are closed is translucent and acts as a diffusive lens for the light producing technology inside the slats 112.

The light producing technology inside the slats consists of a LED array strip 132 that is established in a side-emitting position inside the slat. The LED array strip 132 may project light of virtually any color from one or more side edges of a light guide plate 144. The LED array strip 132 is attached to the light guide plate 144 by reflective permanent tape.

The bottom surface of the light guide plate 144 is joined to a reflective material that functions to project light upward through the translucent surface of the slat.

The light guide plate 144 includes etchings which redirect the light from the side mounted LED array(s) 132 perpendicular from the light source(s). This causes the light from the side mounted LED array strip(s) 132 to be redirected up through the translucent surface of the slat 112.

The slat 112 is co-extruded with two materials: one that is opaque and one that is translucent. It is also unique in that the opaque material covers a greater surface area than does the translucent area, allowing the light emitting parts to remain hidden from view while producing a perfectly evenly distributed light from each slat 112.

When the slats 112 are closed and the light function is turned on, the bottom surface 106 portion of every slat that is opaque is completely overlapped by the light producing translucent surface of the slat 112 below, creating a clean, side to side and top-to-bottom solid lighting surface in the window.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A window blind assembly to provide illumination to the interior of a room and to prevent sunlight from entering the room, comprising:
   a multitude of the light emitting diode (LED) slats mounted in the window opening of a window frame and being rotatably connected to the window frame:
   a light guide plate for guiding LED lights to these light emitting diode slats;
   controller being embedded in the window blind assembly and configured to control the function of each row of the LED slats, wherein the LED slats include a first surface and a second surface and wherein the first surface is opaque and the second surface is translucent;
   wherein the first surface extends around the light guide plate.

2. A window blind assembly as in claim 1, wherein the controller includes a switch to control the on off functions of the LED panels.

3. A window blind assembly as in claim 2, wherein the switch is a capacitive switch configured to sense a finger of the user in close proximity to the capacitive switch.

4. A window blind assembly as in claim 1, wherein the controller is a printed circuit board (PCB).

5. A window blind assembly as in claim 1, wherein the controller includes a Bluetooth/WIFI receiver to send and receive wireless signals from a remote source.

6. A window blind assembly as in claim 1, wherein the LED slats are horizontally oriented.

7. A window blind assembly as in claim 1, wherein the LED slats are vertically oriented.

\* \* \* \* \*